United States Patent
Yokoi et al.

[11] Patent Number: 5,864,346
[45] Date of Patent: Jan. 26, 1999

[54] PICTURE DISPLAY UNIT AND IMAGE DISPLAY SYSTEM

[75] Inventors: Gunpei Yokoi; Takehiro Izushi; Masatoshi Okuno, all of Kyoto, Japan

[73] Assignee: Nintendo Co., Ltd., Kyoto, Japan

[21] Appl. No.: 523,939

[22] Filed: Sep. 6, 1995

[30] Foreign Application Priority Data

Sep. 12, 1994 [JP] Japan .................................. 6-217276

[51] Int. Cl.⁶ ...................................................... G09G 5/00
[52] U.S. Cl. ........................ 345/514; 345/509; 395/739; 463/43
[58] Field of Search .................................... 345/190, 200, 345/204, 523, 524, 514, 509, 515, 507, 516, 517; 395/523, 524, 514, 733, 737, 739, 672, 677, 678; 463/43, 44

[56] References Cited

U.S. PATENT DOCUMENTS 4,562,538  12/1985  Berenbaum et al. ............... 395/182.13

FOREIGN PATENT DOCUMENTS

| 7-16350 | 1/1995 | Japan . |
|---|---|---|
| 7-16351 | 1/1995 | Japan . |
| 7-116354 | 5/1995 | Japan . |
| 2 209 002 | 4/1989 | United Kingdom . |
| 2 239 810 | 7/1991 | United Kingdom . |

*Primary Examiner*—Lun-Yi Lao
*Attorney, Agent, or Firm*—Nixon & Vanderhye P.C.

[57] ABSTRACT

When a game is started, the game execution time is counted by a counter and a determination is made as to whether or not the execution time coincides with a timer value which is set before the game is started, so that the game is forcibly ended upon coincidence. When the game is forcibly ended, the game content before the ending is preserved. Thus, it is not necessary to do the game all over again, in order to restart the game.

18 Claims, 15 Drawing Sheets

FIG. 3

GAME PROGRAM MEMORY 41

| GAME PROGRAM | ~411 |
| --- | --- |
| BG MAP | ~413 |
| CHARACTER DATA | ~414 |
| CLOCK PROGRAM | |
| INTERRUPTION CONTROL PROGRAM | |
| PRESERVATION CONTROL PROGRAM | SHUTDOWN PROCESSING PROGRAM 412 |
| INTERRUPTION TIME COUNTING PROGRAM | |
| INTERRUPTION CANCELLATION PROGRAM | |
| OTHERS | ~415 |

FIG. 4

BACKUP MEMORY 42

| GAME DATA AT SAVE POINTS (VARIOUS VALUES INDICATING STATES OF GAME) |
| --- |

WORK MEMORY 222

PICTURE WORK MEMORY 225

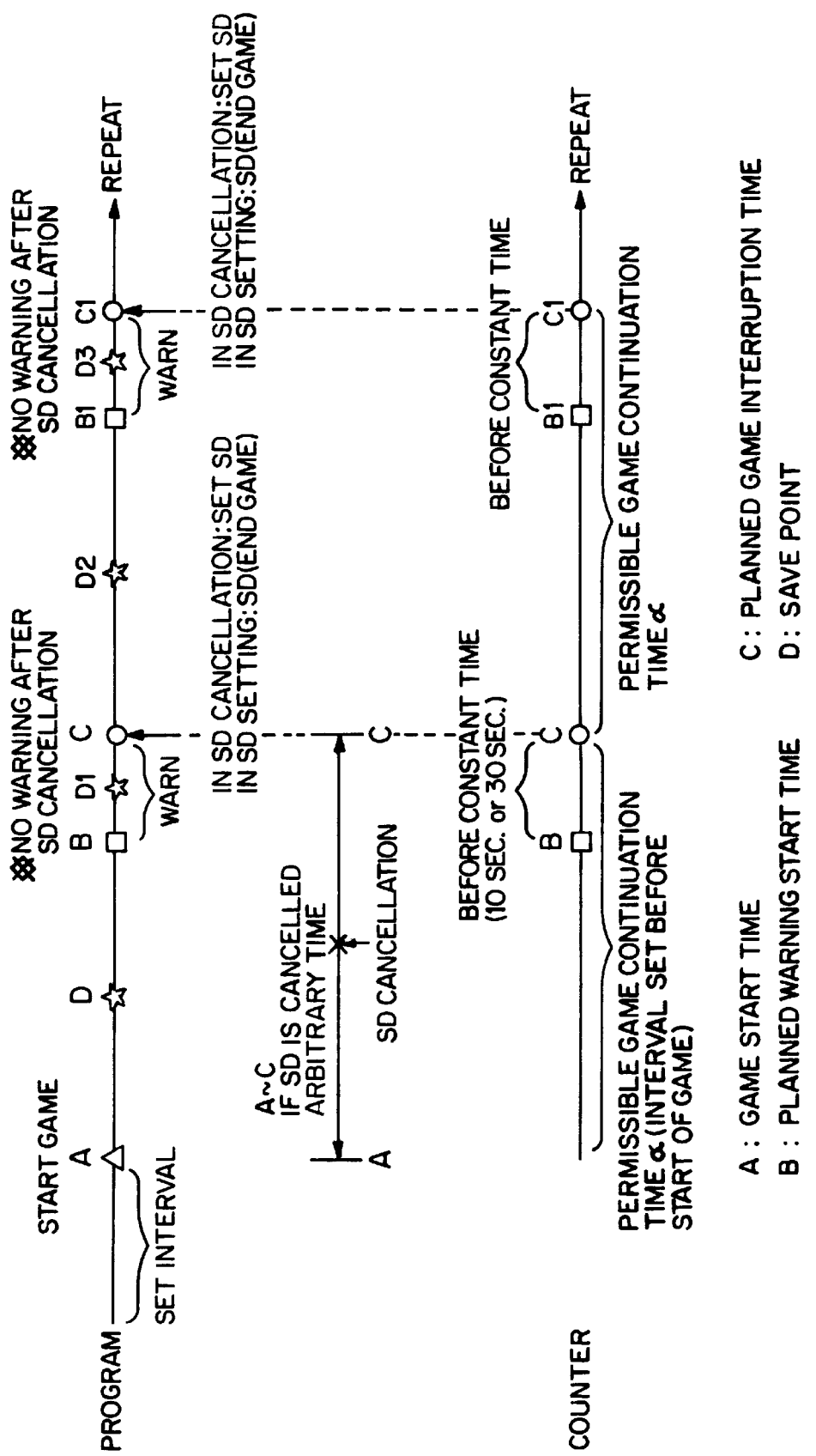

PICTURE DISPLAY UNIT AND IMAGE DISPLAY SYSTEM

BACKGROUND OF THE INVENTION

1. Field of the Invention

The present invention relates to a picture display unit, and more specifically, it relates to a picture display unit for displaying pictures on a display by executing picture display processing in accordance with a prescribed program.

2. Background of the Invention

With rapid development of electronic techniques in recent years, a number of electronic game devices, such as "Super Famicon" (trademark) and "Game Boy" (trademark) manufactured and sold by the assignee of the present application, Nintendo Co., Ltd., for example, are now on the market. Such a conventional electronic game device comprises a display such as a CRT display or a liquid display unit, in order to display game pictures which are formed through execution of a game program.

In the conventional electronic game device, control of the play time is entirely left to the player himself. In general, however, the player is too engrossed in the game to wind up in a proper time. In this case, the shoulders, the back, the fingers, the arms and the eyes of the player are disadvantageously fatigued.

Japanese Utility Model Laying-Open No. 3-25923 (1991) discloses an electronic game device which comprises a timer function, in order to prevent children from excess play. However, the electronic game device described in this gazette is so structured as to simply stop the operation after a lapse of a set time, and hence the player must do the game all over again, in order to replay the game. In this case, the player's enjoyment is dampened. Particularly when recent role playing game requiring a long time must be done over every replay, the game cannot be ended for a long time but the play time is disadvantageously cumulatively increased.

The aforementioned problem is not specific to the electronic game device but can also be caused in other picture display units such as a personal computer, an education device etc. which are operated by programs.

SUMMARY OF THE INVENTION

Accordingly, an object of the present invention is to provide a picture display unit and a picture display system which can prevent the user from getting excessively fatigued.

Another object of the present invention is to provide a picture display unit and a picture display system which may not be redone from the beginning or from a halfway situation upon automatic interruption of the picture display.

According to a first aspect of the present invention, a picture display unit comprises program storage means storing a picture display program;

processing means executing picture display processing in accordance with the picture display program stored in the program storage means;

data storage means capable of storing progress situation data for indicating the progress situation of the picture display processing;

decision means deciding a state for preserving the progress situation data at a predetermined proper save point;

data preservation control means for storing the progress situation data in the data storage means every decision of the decision means on the state for preserving the progress situation data;

counter means for counting a continuous execution time of the picture display processing by the processing means;

interruption means for interrupting execution of the picture display processing by the processing means when the continuous execution time counted by the counter means reaches a prescribed relation with a predetermined permissible picture display continuation time; and restarting control means for making the processing means restart the execution of the picture display processing from the save point ahead of the interruption on the basis of the progress situation data stored in the data storage means when a prescribed condition for restarting is satisfied after the interruption means interrupts the execution of the picture display processing by the processing means.

According to the first aspect of the present invention, as hereinabove described, execution of the picture display processing is interrupted when the continuous execution time of the picture display processing reaches a prescribed relation with the previously set permissible picture display continuation time, whereby the user can be prevented from getting fatigued by a long continuous operation. Further, execution of the picture display processing is not permitted until the prescribed condition for restarting is satisfied after the interruption of the execution of the picture display processing, whereby the user is forced to take a rest. Thus, it is possible to ensure an opportunity for the user to recover from his fatigue.

According to the first aspect of the present invention, further, data indicating the progress situation of the picture display processing is preserved at each predetermined save point so that the picture display processing is restarted from the state of the save point ahead of the interruption of the execution of the picture display processing when the prescribed condition for restarting is satisfied after the interruption of the picture display processing, whereby the user does not have to do the operation all over again. Further, the operation can be restarted not from the state at the interruption of the picture display processing but from the save point ahead of the interruption whereby the operation can be started from a convenient timing. Consider that the present invention is applied to a video game, for example. If the game is preserved in a state at an interruption time, the game may disadvantageously be preserved in a state immediately before the enemy's attack. In this case, the player disadvantageously comes under unavoidable attack immediately after restarting. When the game can be restarted from the state of the predetermined save point (convenient timing is selected), the aforementioned disadvantageous situation can be avoided.

In the aforementioned first aspect of the present invention, the previously set permissible picture display continuation time can be rendered changeable. Alternatively, the state of interruption of the picture display processing can be made cancelable before the prescribed condition for restarting is satisfied.

The data storage means may be provided with a temporary storage area and a preservation storage area, so that the progress situation data is stored in the temporary storage area at each save point and this progress situation data stored in the temporary storage area is stored in the preservation storage area when execution of the picture display processing is interrupted and the execution of the picture display processing is restarted from the save point ahead of the interruption. In this case, progress situation data at a plurality of save points may be stored in the temporary storage area so that selected progress situation data is read from the plurality of progress situation data which are stored in the temporary storage area and stored in the preservation storage area. Thus, the user can restart his operation from a convenient point.

The execution of the picture display processing may be restarted from the save point ahead of the interruption when the permissible interruption continuation time for the picture display processing reaches a prescribed relation with the previously set restartable time. In this case, the previously set restartable time may be rendered changeable.

According to a second aspect of the present invention, a picture display system comprises a picture display unit body outputting a picture signal by executing picture display processing in accordance with a picture display program, and a cartridge which can be detachably connected to the picture display unit body, and the cartridge comprises:
  a substrate, and
  program storage means which is provided on the substrate for storing the picture display program and an interruption processing program, the picture display unit body comprises:
  processing means for executing picture display processing in accordance with the picture display program,
  decision means for deciding a state for preserving progress situation data at a previously set proper save point when the processing means executes picture display processing,
  data preservation control means for storing the progress situation data in the data storage means every time the decision means decides the state for preserving the progress situation data,
  counter means for counting a continuous execution time of picture display processing by the processing means,
  interruption means for interrupting the execution of the picture display processing by the processing means when the continuous display time counted by the counter means reaches a prescribed relation with a previously set permissible picture display continuation time, and
  restarting control means for making the processing means restart execution of the picture display processing from the save point ahead of the interruption on the basis of the progress situation data stored in the data storage means when a prescribed condition for restarting is satisfied after the interruption means interrupts the execution of the picture display processing by the processing means, and the cartridge is mounted on the picture display unit body to electrically connect the substrate with the picture display unit body, so that the decision means, the data preservation control means, the counter means, the interruption means and the restarting control means operate in accordance with the interruption processing program in response to the processing means executing the picture display program.

According to the second aspect of the present invention, as hereinabove described, the program storage means provided in the cartridge which is detachably mounted on the picture display unit body stores the picture display program and the interruption processing program. Therefore, the user is provided with the interruption time and the interruption method which are optimum for the picture display program.

In the aforementioned second aspect of the present invention, the previously set permissible picture display continuation time may be rendered changeable. Further, the state interrupting the execution of the picture display processing may be rendered cancelable before the prescribed condition for restarting is satisfied.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates the memory map of a program memory 41 shown in FIG. 2;

FIG. 4 illustrates the memory map of a backup memory 42 shown in FIG. 2;

FIG. 10 is a timing chart showing an operation or a manipulation which is related to the shutdown processing in the first embodiment;

DESCRIPTION OF THE PREFERRED EMBODIMENTS

Figure 1:
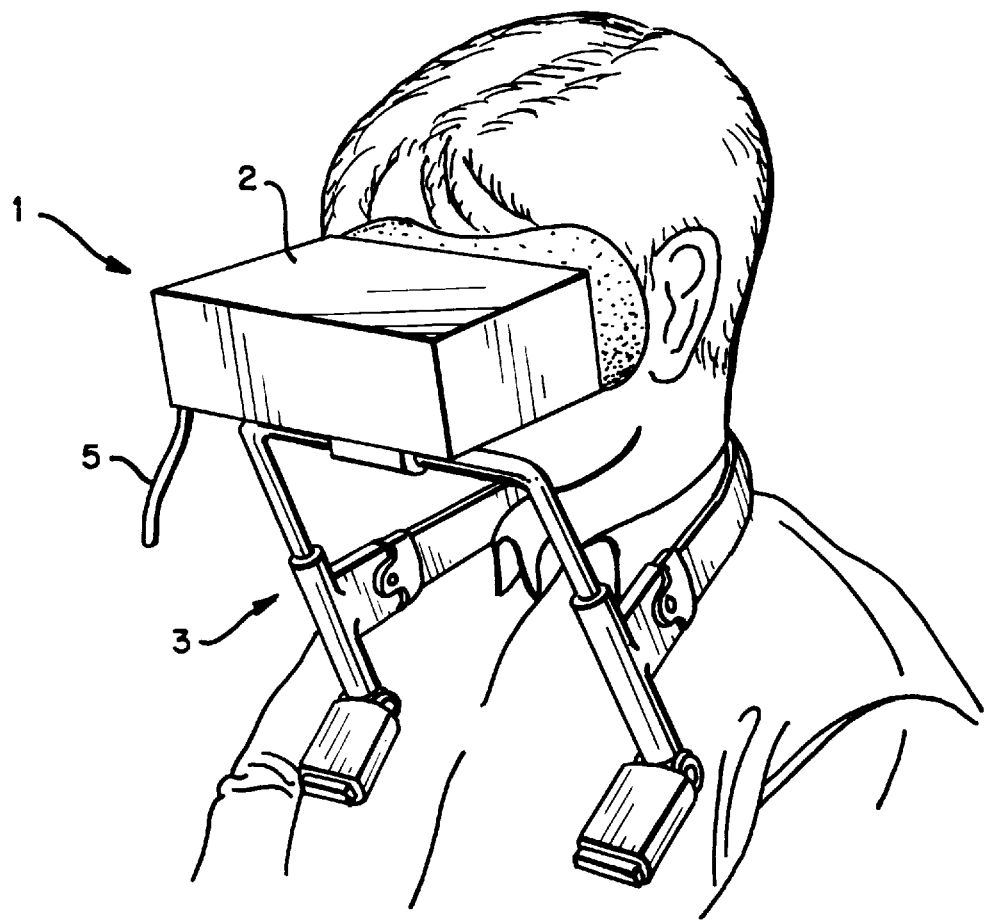
FIG. 1 is a perspective view showing a used state of an electronic game device according to a first embodiment of the present invention.
Figure 2:
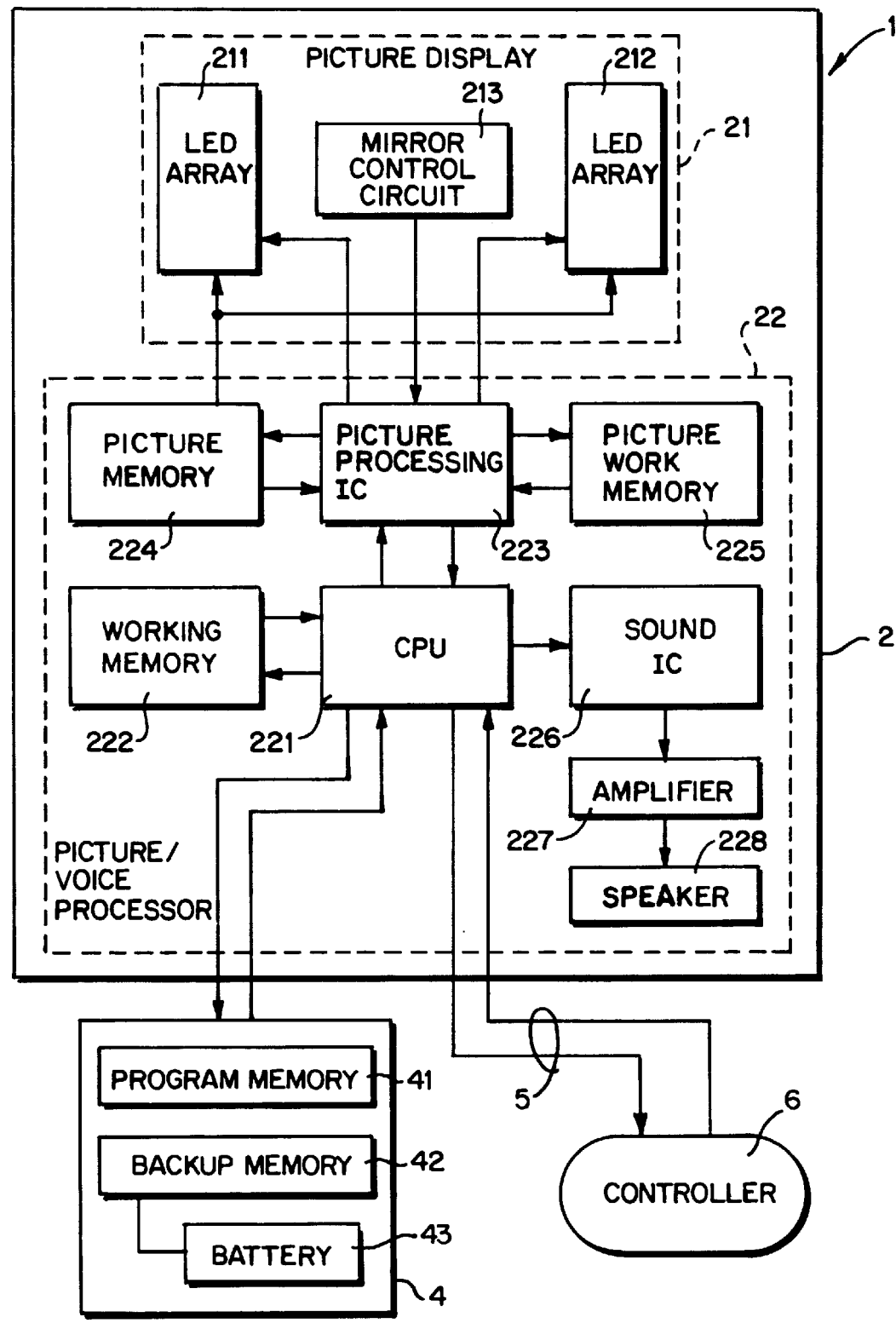
FIG. 2 is a block diagram showing the electric structure of the electronic game device shown in FIG. 1.

FIG. 1 is a perspective view showing a used state of an electronic game device 1 according to a first embodiment of the present invention. FIG. 2 is a block diagram showing the electric structure of the electronic game device 1 shown in FIG. 1. With reference to FIGS. 1 and 2, the structure of this embodiment is now described.

The electronic game device 1 comprises a body unit 2 storing a picture display 21 and a picture/voice processor 22. This body unit 2 is supported by a support 3 in the vicinity of a front part of the player's face. The player can observe the game pictures by looking into the body unit 2. According to this embodiment, the body unit 2 is so structured as to display three-dimensional pictures. A program cartridge 4 storing game programs etc. is detachably mounted on the body unit 2. Further, the body unit 2 is connected with a controller 6 through a connecting cord 5.

Figure 15:
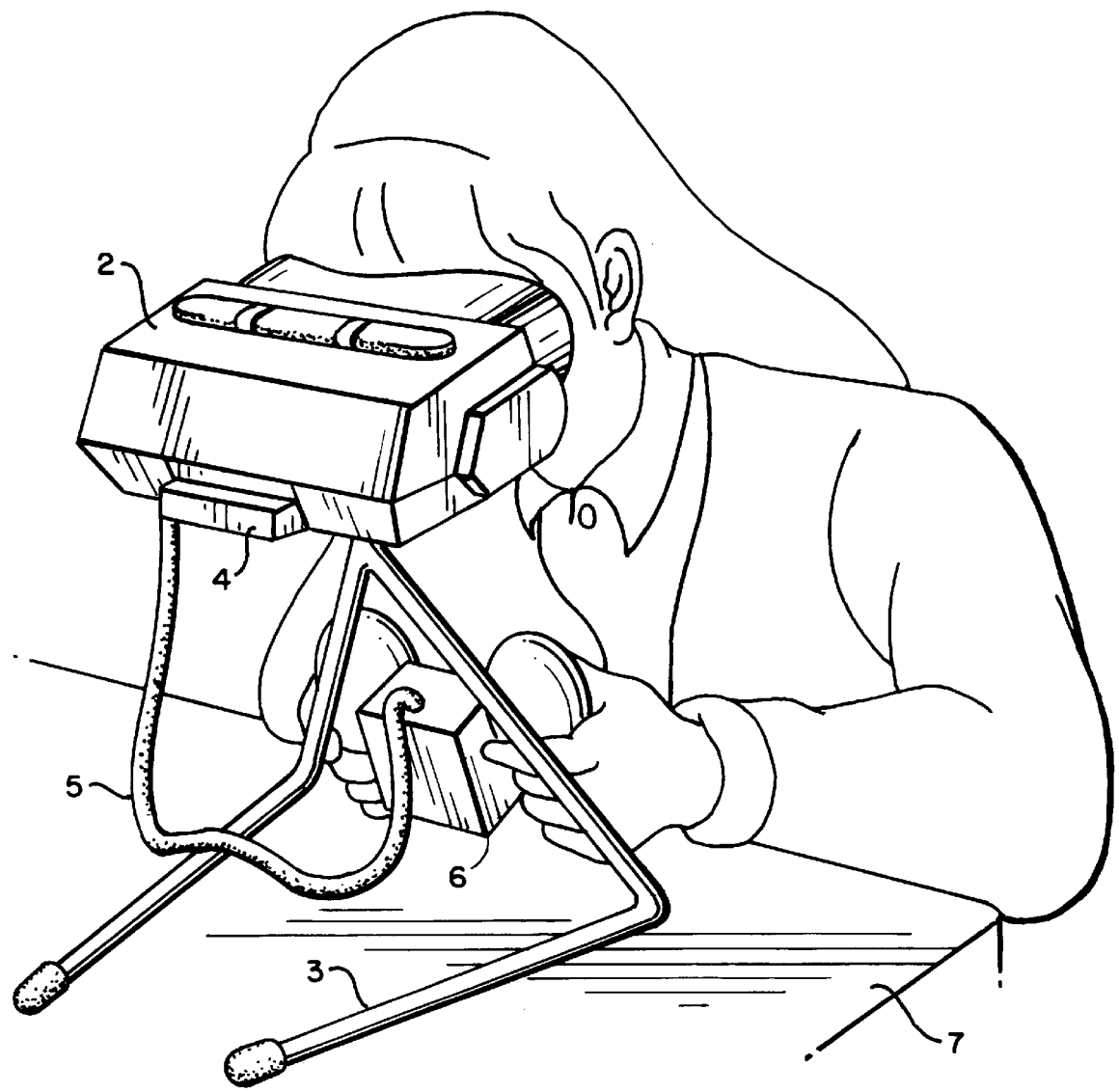
FIG. 15 is a perspective view showing another exemplary structure of the electronic game device according to the present invention.

The aforementioned body unit 2 may be set on a table 7 as shown in FIG. 15, in place of being set on the player by the support 3.

Figure 16:
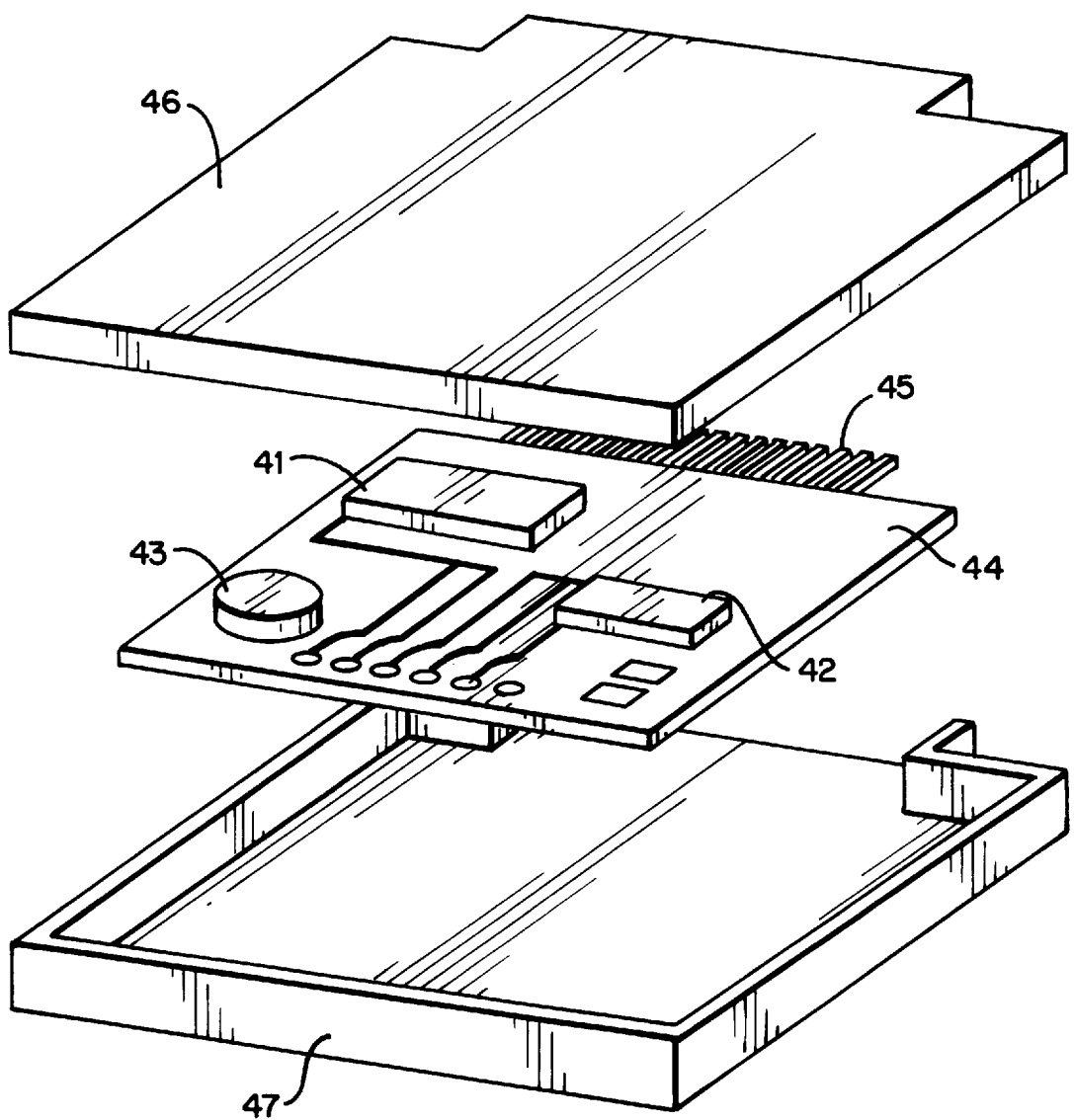
FIG. 16 is an exploded perspective view showing an exemplary structure of a program cartridge 4.

The program cartridge 4 includes a program memory 41 which is formed by a non-volatile storage medium such as a ROM or a CD-ROM, a backup memory 42 which is formed by a reloadable storage element such as a RAM, and a battery 43 which is formed by a lithium battery or the like. The program memory 41, the backup memory 42 and the battery 43 are mounted on a substrate 44 having terminals 45 as shown in FIG. 16, for example, and the substrate 44 is stored in a case which is formed by upper and lower housings 46 and 47.

As shown in FIG. 3, the game program memory 41 includes an area 411 storing the game program, an area 412 storing a shutdown processing program, an area 413 storing data (hereinafter referred to as BG map data) of character codes (codes corresponding to character data described later) for BG display, an area 414 storing dot data (hereinafter referred to as character data) for displaying BG (background pictures) and animation characters (objects), and an area 415 storing other data. The shutdown processing program stored in the area 412, which describes an algorithm for forcibly ending the game after a lapse of a constant time from starting thereof, is formed by a clock program, an interruption control program, a preservation control program, an interruption time counting program, and an interruption cancellation program.

As shown in FIG. 4, the backup memory 42 stores game data (various values indicating game states) at respective save points. The game data stored in the backup memory 42, which is formed by a RAM, are backed up by a battery 43 so that the game data are not erased.

As shown in FIG. 2, the picture/voice processor 22 includes a CPU 221, a work memory 222, a picture processing IC 223, a picture memory 224, a picture work memory 225, a sound IC 226, an amplifier 227, and a speaker 228. The CPU 221 operates along the game program 411 and the shutdown processing program 412 which are stored in the program memory 41.

Figure 5:
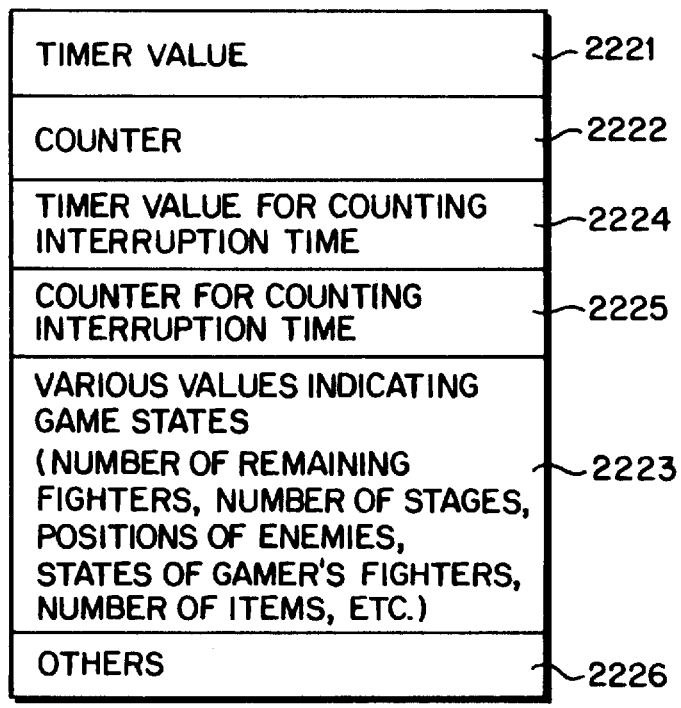
FIG. 5 illustrates the memory map of a work memory 222 shown in FIG. 2.

As shown in FIG. 5, the work memory 222 includes an area 2221 storing a timer value, a counter area 2222 serving as a counter, an area 2223 storing various values, such as the number of remaining machines, the number of sides, the positions of the enemies, the states of the player's machines, the number of items etc., indicating the game states, an area 2224 storing a timer value for counting the interruption time, an area 2225 employed as an interruption time counter, and an area 2226 storing other data. The timer value which is stored in the area 2221 defines a time interval from starting of the game to shutdown processing (forcible game interruption processing), i.e., a permissible game continuation time α (e.g., 30 minutes or 1 hour). The electronic game device may be so formed that the timer value can be changed by the player's operation. On the other hand, the interruption time counting timer value which is stored in the area 2224 defines a game restartable time γ up to permission for cancellation of game interruption caused by the shutdown processing.

Figure 6:
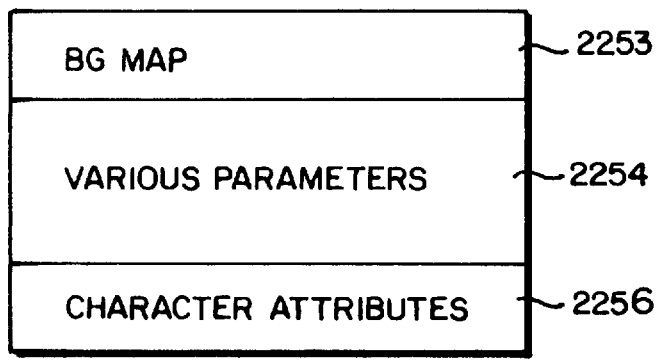
FIG. 6 illustrates the memory map of a picture work memory 225 shown in FIG. 2.

The picture processing IC 223 reads necessary data from the picture memory 224 and the picture work memory 225 in accordance with an instruction from the CPU 221, to generate various picture data for the game. The IC 223 which is dedicated for picture processing is provided independently of the CPU 221, in order to lighten the processing of the CPU 221 thereby improving the picture processing speed. As shown in FIG. 6, the picture work memory 225 includes an area 2253 storing the BG map data read from the area 413 of the program memory 41, an area 2254 storing various parameters such as parallax, positions, numbers, information for pallet selection etc. and parameters for gradation selection etc., and an area 2256 storing attribute data such as name data, inversion data and size selection data of the respective animation characters.

Figure 7:
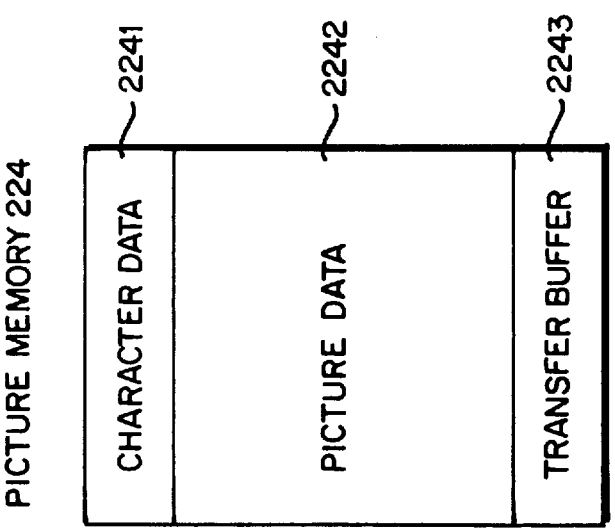
FIG. 7 illustrates the memory map of a picture memory 224 shown in FIG. 2.

As shown in FIG. 7, the picture memory 224 includes an area 2241 storing the character data read from the area 414 of the program memory 41, an area 2242 storing the picture data for the game which are generated by the picture processing IC 223 by at least four screens, and a transfer buffer area 2243 for reading the picture data which are stored in the area 2242 by four columns and transferring the picture data.

The picture display 21 shown in FIG. 2 includes a pair of LED (light emitting diode) arrays 211 and 212, and a mirror control circuit 213. In each of the LED arrays 211 and 212, 224 LEDs are aligned with each other perpendicularly to the visual field of the player. In the picture display 21 according to this embodiment, seriate light beams outgoing from the LED arrays 211 and 212 are reflected by mirrors (not shown) respectively, to thereafter enter the left and right eyes of the player respectively. The mirror control circuit 213 reciprocatively rotates the mirrors every constant period in synchronization with a prescribed clock signal, thereby horizontally scanning the seriate light beams outgoing from the LED arrays 211 and 212 respectively. The picture Processing IC 223 transfers picture data for 384 columns from the picture memory 224 to the LED arrays 211 and 212 every time the mirror control circuit 213 rotates the mirrors once. Therefore, the player recognizes pictures which are formed by 224 by 384 dots, due to persistence of vision. Prescribed parallax is provided between pictures for the left and right eyes which are formed by the beams outgoing from the LED arrays 211 and 212 respectively, whereby the player can observe deep stereoscopic pictures.

Figure 9:
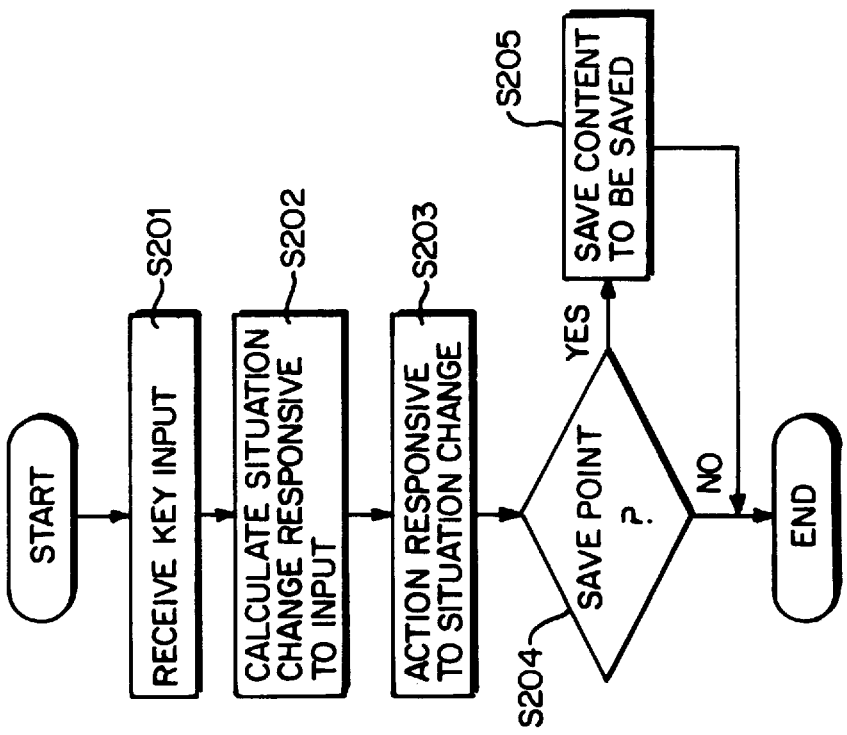
FIG. 9 is a flow chart showing an operation of the CPU 221 along a game program in the first embodiment.
Figure 8:
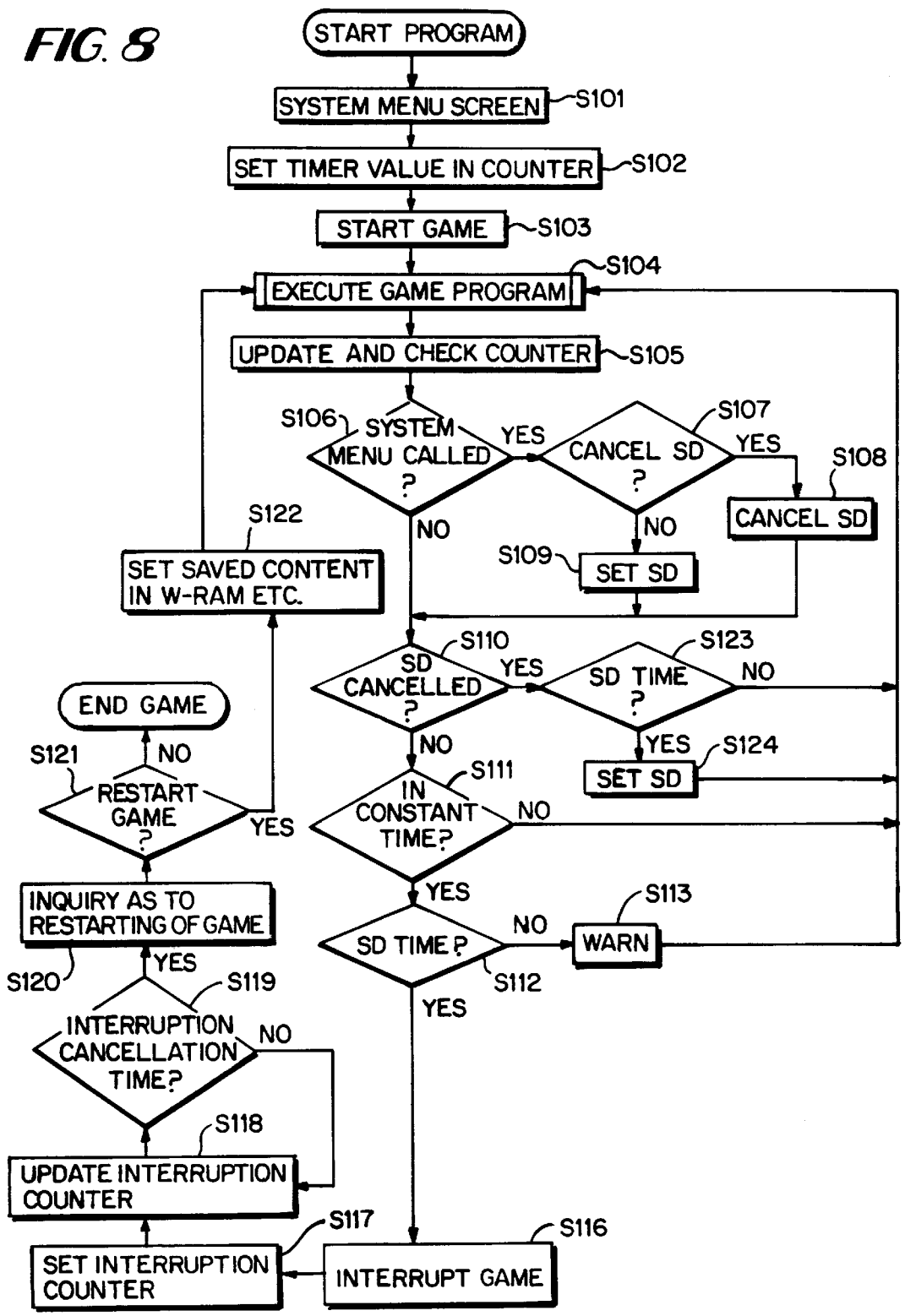
FIG. 8 is a flow chart showing an operation of a CPU 221 along a shutdown processing program in the first embodiment.

FIG. 8 is a flow chart showing an operation of the CFU 221 along the shutdown processing program (see FIG. 3) which is stored in the program memory 41 of the program cartridge 4. FIG. 9 is a flow chart showing an operation of the CPU 221 along the game program which is also stored in the program memory 41. FIG. 10 is a timing chart showing an operation or a manipulation related to the shutdown processing in the electronic game device 1 according to the first embodiment. With reference to FIGS. 8 to 10, the operations of the electronic game device 1 according to the first embodiment are now described.

When a power source (not shown) is turned on, the shutdown processing program shown in FIG. 8 is started. When the shutdown processing program is started, the CPU 221 controls the picture processing IC 223, to display a system menu screen on the picture display 21 (step S101). Then, the CPU 221 sets the timer value, which is stored in the area 2221 (see FIG. 5) of the work memory 222, in the counter area 2222 (step S102). Thus, the permissible game continuation time α which is defined by the timer value is set in the counter area 2222. Then, the CPU 221 starts the game program (step S103, at a timing A in FIG. 10), to execute the game program (step S104). FIG. 9 shows execution of the game program, Referring to FIG. 9, the CPU 221 receives key input from the controller 6, which is operated by the player (step S201). Then, the CPU 221 calculates change in situation of the game state in response to the key input (step S202). Then, the CPU 221 executes an action responsive to the change in situation calculated at the step S202 (step S203). In more concrete terms, the CPU 221 controls the picture processing IC 223 for generating changed pictures, and displays the changed pictures on the picture display 21. Further, the CPU 221 controls the sound IC 226 to generate changed sounds, and outputs the changed sounds from the speaker 228. Then, the CPU 221 determines whether or not the game state reaches a save point (step S204). This save point appears at a breakpoint situation in the progress of the game, when a certain stage is cleared, the leading character indicates his intention for save, or the player's fighters are wiped-out, for example (timing D in FIG. 10). Upon appearance of the save point, the CPU 221 stores the game content to be saved such as the number of cleared stages, the state of the leading character, the types and the number of held items etc. in the backup memory 42 (see FIG. 4) (step S205). After completion of the save, or in appearance of no save point, the CPU 221 ends the operation shown in FIG. 9, and returns to the operation of FIG. 8.

Referring again to FIG. 8, the CPU 221 updates (decrements) and checks the count value of the counter area 2222 (step S105). The counter area 2222 is periodically updated and checked every prescribed time. Then, the CPU 221 determines whether or not the system menu screen is called by the player operating the controller 6 (step S106). If the system menu screen is called, the CPU 221 determines whether the player selects cancellation of the shutdown (SD) processing or setting thereof (step S107). If cancellation of the shutdown processing is selected, the CPU 221 resets a shutdown flag (not shown) (step S108). Thus, the shutdown processing is canceled. When setting of the shutdown processing is selected, on the other hand, the CPU 221 sets the shutdown flag (not shown) (step S109).

If no system menu screen is called at the step S106 or after completion of the step S108 or S109, the CPU 221 determines whether or not the shutdown processing is canceled by checking the aforementioned shutdown flag (step S110). If the shutdown processing is not canceled, the CPU 221 determines whether or not the remaining time up to a planned game interruption time (timing C in FIG. 10) is less than a constant time such as 30 seconds or 1 minute, for example, on the basis of the result of the checking of the count value of the counter area 2222 at the step S105 (step S111). Namely, the CPU 221 determines that the remaining time is in excess of the constant time if the count value of the counter area 2222 is larger than a prescribed value, while the CPU 221 determines that the remaining time is less than the constant time if the count value is smaller than the prescribed value. When the remaining time is in excess of the constant time, the CPU 221 returns to the operation at the step S104 again.

When the remaining time is less than the constant time (period between timings B and C in FIG. 10), on the other hand, the CPU 221 determines whether or not the planned game interruption time (timing C in FIG. 10) comes, i.e., whether or not the count value of the counter area 2222 is zeroed (step S112). If the planned game interruption time has not yet come, the CPU 221 executes a prescribed warning operation (step S113). Namely, the CPU 221 sounds an alarm from the speaker 228 or displays a warning message on the picture display 21, to inform the player of the fact that the game is soon forcibly ended. After the warning, the CPU 221 returns to the operation at the step S104 again.

If a determination is made at the step S112 on that the planned game interruption time comes, on the other hand, the CPU 221 interrupts the game (step S116). Then, the interruption time counting program is started and the CPU 211 sets the interruption time counting timer value, which is stored in the area 2224 (see FIG. 5) of the work memory 222, in the counter area 2225 (step S117). Thus, the game restartable time γ which is defined by the interruption time counting timer value is set in the counter area 2225. Then, the CPU 221 updates (decrements) and checks the count value of the interruption time counter area 2224 (step S118). The interruption time counter area 2224 is periodically updated and checked every prescribed time. Then, the CPU 221 determines whether or not a planned interruption cancellation time comes (step S119). If the planned interruption cancellation time has not yet come, the CPU 221 returns to the operation at the step S118 again. If the planned interruption cancellation time comes, on the other hand, the CPU 221 inquires of the player it he wishes to restart the game through a picture or the like (step S120). The player selects restarting or stoppage of the game through the controller 6 or the like (step S121). If the player selects restarting of the game, the CPU 221 sets the saved content in the work memory or the like in accordance with the interruption cancellation program (step S122). Then, the CPU 221 returns to the operation at the step S104. If the player selects stoppage of the game, on the other hand, the game is ended.

According to the first embodiment, as hereinabove described, the game operation is automatically interrupted when the planned game interruption time comes after a lapse of the previously set permissible game continuation time α upon starting of the game. Further, the game cannot be restarted unless the game restartable time γ is lapsed after the game interruption, whereby the player can be prevented from immediately restarting the game by his self-willed operation and can reliably take a rest. Further, the backup memory 42 preserves the game content at the save point immediately ahead of the interruption or ending of the game operation, whereby the player does not have to do the game all over again for restarting the game. Therefore, it is not necessary to forcibly postpone the planned game end time, and long-time continuous play can be avoided.

The system menu screen called at the step S106 may be formed by that which can lighten the burden imposed on the player's eyes from the medical point of view, such as a still screen with no parallax, for example, so that the player can take a rest by observing the system menu screen. When the player feels that he has recovered from eye fatigue by observing the system menu screen, he may cancel the shutdown processing to continue the game.

Description is now made on an operation in the case where the player cancels the shutdown processing before the permissible game continuation time α is lapsed, i.e., before the planned game interruption time comes, In this case, the shutdown flag is reset at the step S108. Therefore, the CPU 221 determines that the shutdown processing is canceled at the step S110, from the reset state of the shutdown flag.

Then, the CPU 221 determines whether or not the planned game interruption time comes (step S123). If the planned game interruption time has not yet come, the CPU 221 returns to the operation at the step S104 again. If the planned game interruption time comes, on the other hand, the CPU 221 sets the shutdown flag while setting the timer value, which is stored in the area 2221 of the work memory 222, in the counter area 2222 again (step S124). Thus, the shutdown processing is started again. Namely, a counting operation for the permissible game continuation time α is re-started from the first planned game interruption time (timing C in FIG. 10), so that the game content is preserved and thereafter the game is automatically interrupted when a second planned game interruption time (timing C1 in FIG. 10) comes (step S116). Thereafter the CPU 121 executes the operation at the steps S117 to S122.

When the shutdown processing is canceled again in the second interval before the planned game interruption time comes, neither warning operation nor game ending operation is carried out similarly to the aforementioned first interval, but the shutdown processing is restarted for a third interval after the second planned game interruption time comes. Thereafter a similar operation is repeated.

When the shutdown processing is canceled before a lapse of the permissible game continuation time α at a certain interval, shutdown processing for a next interval is restarted after the planned game ending time in this interval comes in the first embodiment as hereinabove described, while the shutdown processing for the next interval may alternatively be restarted when the shutdown processing is canceled. Such case is now described with reference to a second embodiment.

Figure 11:
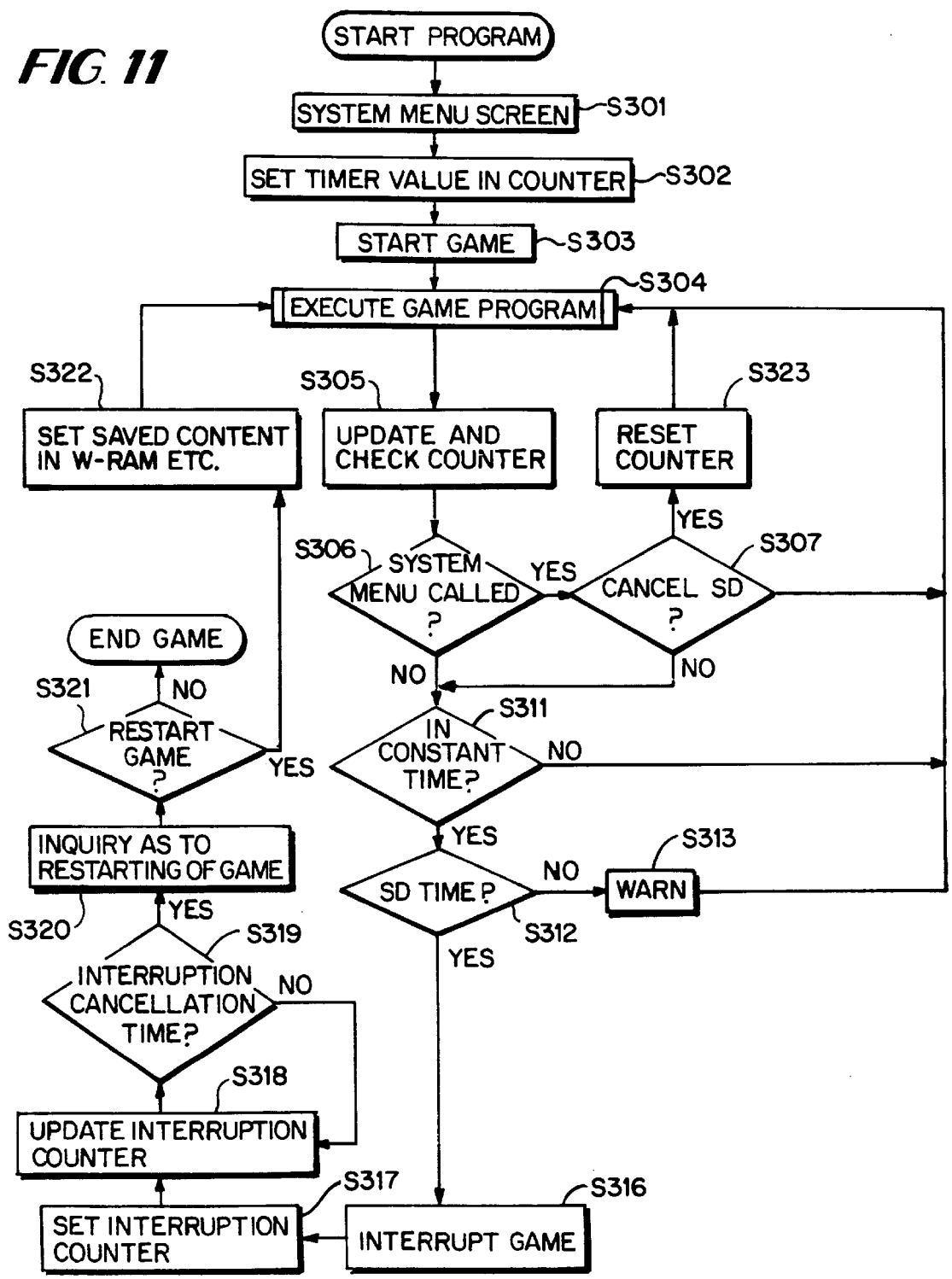
FIG. 11 is a flow chart showing an operation of the CPU 221 along the shutdown processing program in a second embodiment of the present invention.
Figure 12:
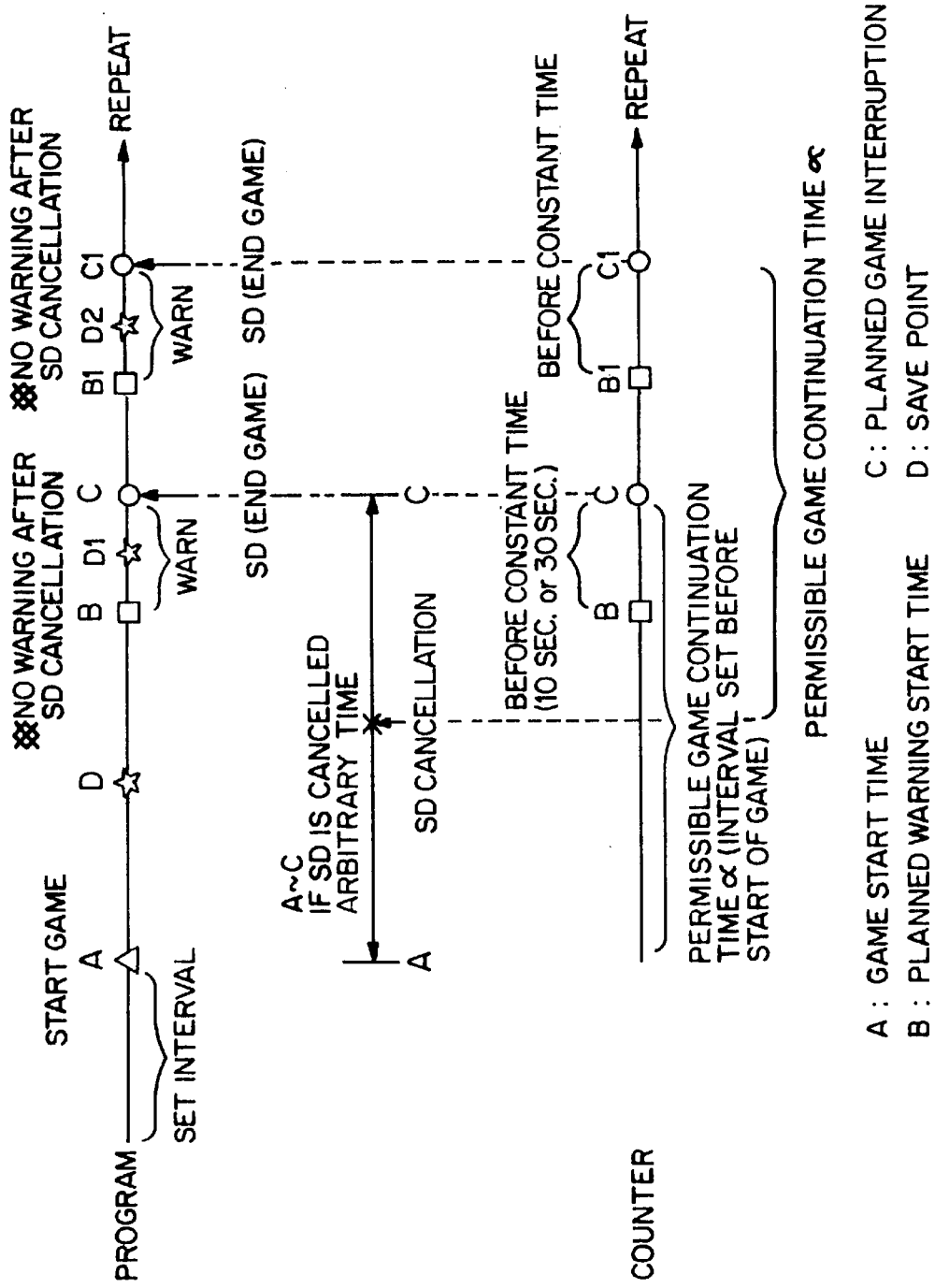
FIG. 12 is a timing chart showing an operation or a manipulation which is related to the shutdown processing in the second embodiment.

FIG. 11 is a flow chart showing a shutdown processing program in the second embodiment of the present invention. FIG. 12 is a timing chart showing a manipulation or an operation related to the shutdown processing. With reference to FIGS. 11 and 12, the operation of an electronic game device according to the second embodiment is now described. The device structure is similar to that of the first embodiment (FIGS. 1 to 7), and hence the following description is made with reference to the structure of the first embodiments.

In the second embodiment, an operation in case where the shutdown processing is not canceled halfway is similar to that in the first embodiment. Referring to FIG. 11, operations at steps S301 to S307 and S311 to S322 are similar to those at the steps S101 to S107 and S111 to S122 in FIG. 8 respectively. The operation of executing the game program at the step S304 is similar to that shown in FIG. 9.

When a determination is made at the step S307 that halfway cancellation of the shutdown processing is selected, the CPU 221 resets the counter area 2222 of the work memory 222, and re-sets the timer value (permissible game continuation time α), which is stored in the area 2221, in the counter area 2222 (step S322). Thus, shutdown processing for the next interval is restarted from the time when the shutdown processing is canceled halfway (see FIG. 12). Thereafter the CPU 221 returns to the operation at the step S304. Then, (if no further halfway cancellation is made), the game is automatically interrupted after a lapse of the permissible game continuation time α from the aforementioned time of halfway cancellation of the shutdown processing (step S316).

According to the second embodiment, the shutdown processing for the next interval is started immediately after halfway cancellation of the shutdown processing, whereby it is not necessary to provide a shutdown flag, dissimilarly to the first embodiment. According to this embodiment, therefore, no processing corresponding to the steps S108, S109, S110, S123 and S124 (see FIG. 8) in the first embodiment is carried out.

While the permissible game continuation time α which in set for the next interval when the shutdown processing is canceled halfway is a fixed value which is set before starting of the game in the aforementioned second embodiment, the permissible game continuation time may alternatively be set as a variable value in the case of halfway cancellation. Such an example is now described as a third embodiment.

Figure 13:
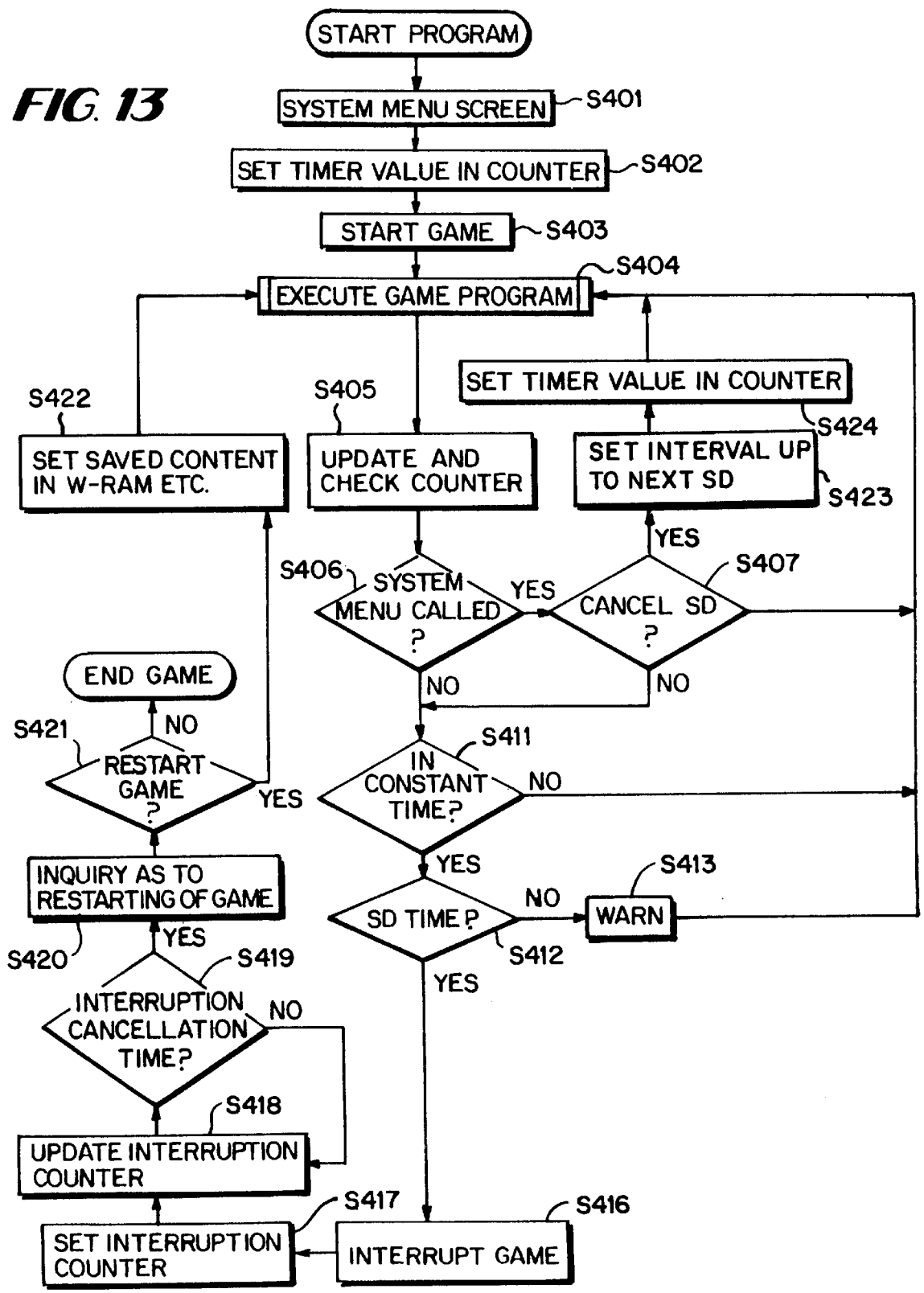
FIG. 13 is a flow chart showing an operation of the CPU 221 along a shutdown processing program in a third embodiment of the present invention.
Figure 14:
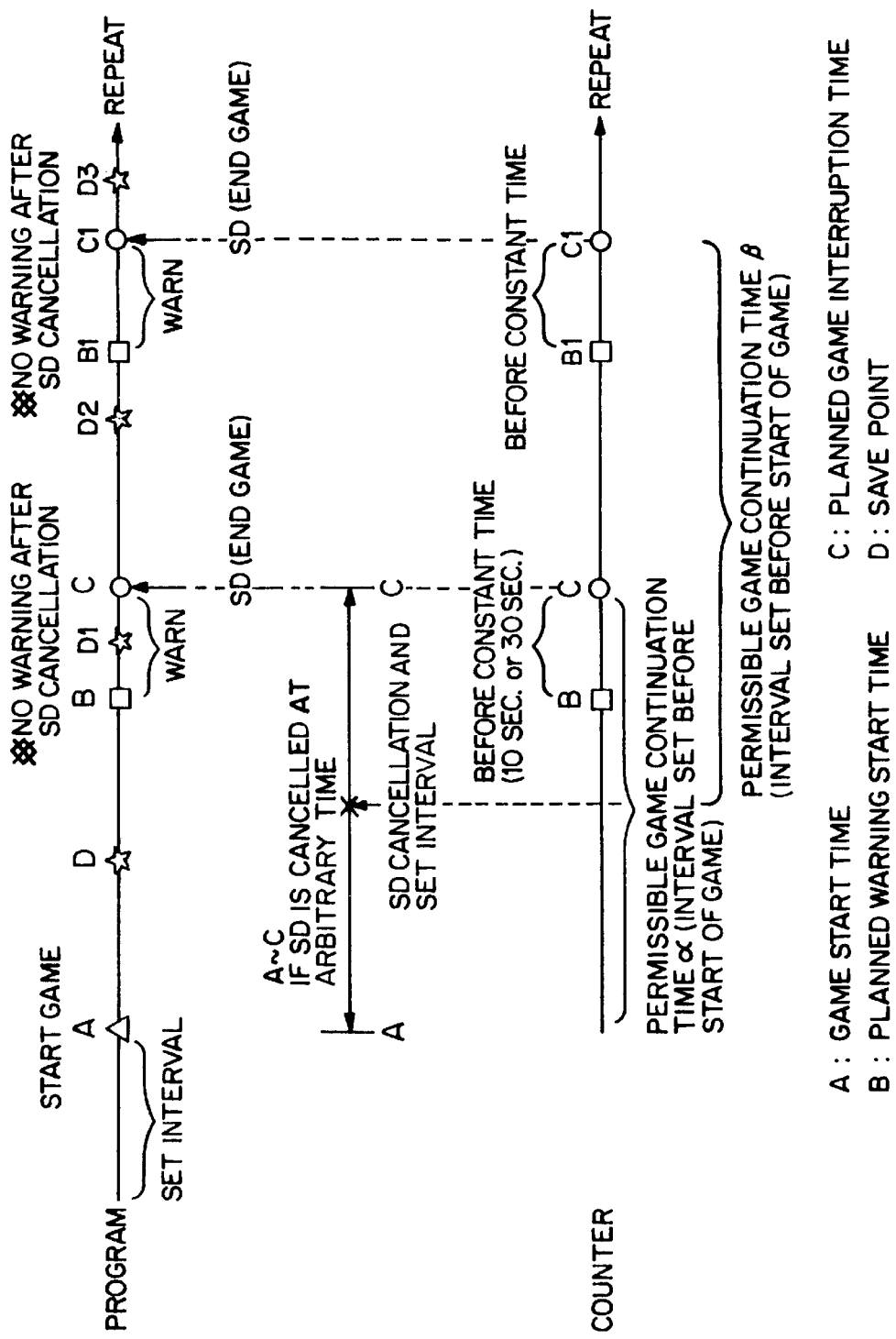
FIG. 14 is a timing chart showing an operation or a manipulation which is related to the shutdown processing in the third embodiment.

FIG. 13 is a flow chart showing a shutdown processing program in the third embodiment of the present invention. FIG. 14 is a timing chart showing a manipulation or an operation related to the shutdown processing in the third embodiment. With reference to FIGS. 13 and 14, the operation of an electronic game device according to the third embodiment is now described. The device structure is similar to that of the first embodiment (FIGS. 1 to 7), and hence the following description is made with reference to the structure of the first embodiments.

In the third embodiment, an operation in case where the shutdown processing is not canceled halfway is similar to that in the first embodiment. Referring to FIG. 13, operations at steps S401 to S407 and S411 to S422 are similar to those at the steps S101 to S107 and S111 to S122 in FIG. 8 respectively. The operation of executing a game program at the step S404 is similar to that shown in FIG. 9.

When a determination is made at the step S407 that halfway cancellation of the shutdown processing is selected, the CPU 221 sets an interval up to a next planned game interruption time which is inputted by the player through operation of the controller 6, i.e., a permissible game continuation time β, in the area 2221 of the work memory 222 (step S423). Then, the CPU 221 sets the timer value (permissible game continuation time β), which is set in the area 2221, in the counter area 2222 (step S424). Thus, shutdown processing for the next interval is restarted from the time when the shutdown processing is canceled halfway (see FIG. 14). Thereafter the CPU 221 returns to the operation at the step S404. Then, (if no further halfway cancellation is made), the game is automatically interrupted after a lapse of the permissible game continuation time from the aforementioned time of halfway cancellation of the shutdown processing (step S416).

According to the third embodiment, the shutdown processing for the next interval is started immediately after halfway cancellation of the shutdown processing, whereby it is not necessary to provide a shutdown flag dissimilarly to the first embodiment, similarly to the second embodiment. According to this embodiment, therefore, no processing corresponding to the steps S108, S109, S110, S123 and S124 (see FIG. 8) in the first embodiment is carried out.

While each of the first to third embodiments is so set that the interruption state cannot be canceled for a certain time after interruption of the game, the game may alternatively be ended immediately after the game content is preserved.

While the game restartable time γ is previously set in an unchangeable manner in each of the aforementioned embodiments, the game restartable time γ may alternatively be rendered changeable by the player's operation.

Figure 17:
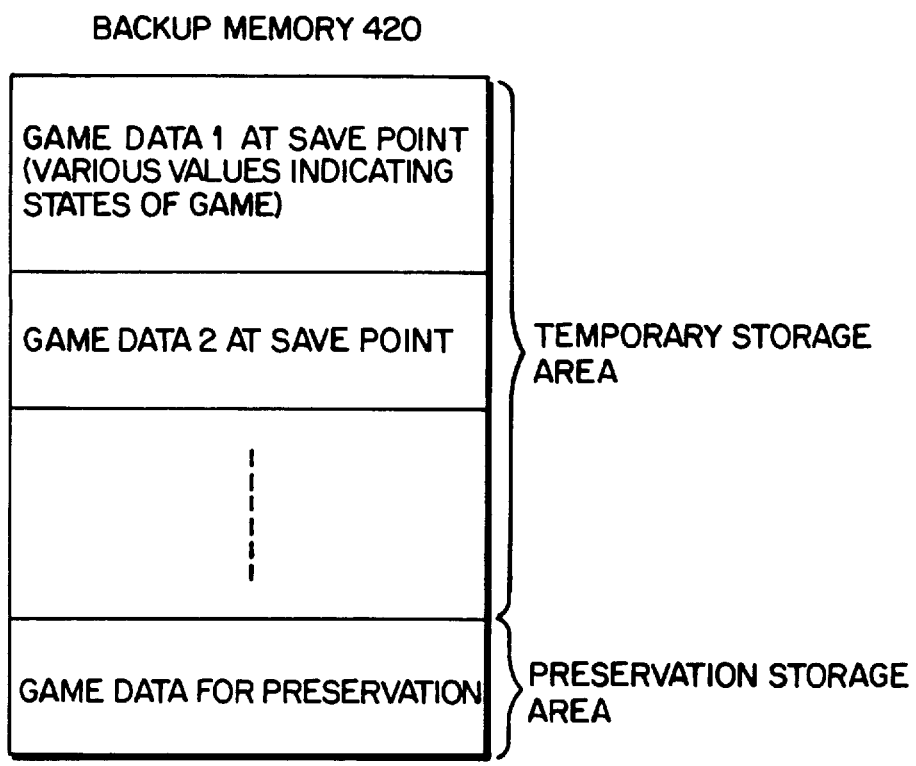
FIG. 17 illustrates the memory map of a backup memory which is employed in a fourth embodiment of the present invention.

A fourth embodiment of the present invention is now described. In the structure of the fourth embodiment, the backup memory 42 of the first embodiment is merely replaced by a backup memory 420 shown in FIG. 17, and the remaining structure is similar to that shown in FIG. 2. As shown in FIG. 17, the backup memory 420 has a temporary storage area and a preservation storage area. The temporary storage area stores game data at a plurality of save points. On the other hand, the preservation storage area stores game data of a specific save point which is selected by the user. Most part of the structure of this embodiment is similar to that shown in FIG. 2 as described above, and hence the operation of the fourth embodiment is described with reference to FIG. 2.

Figure 18:
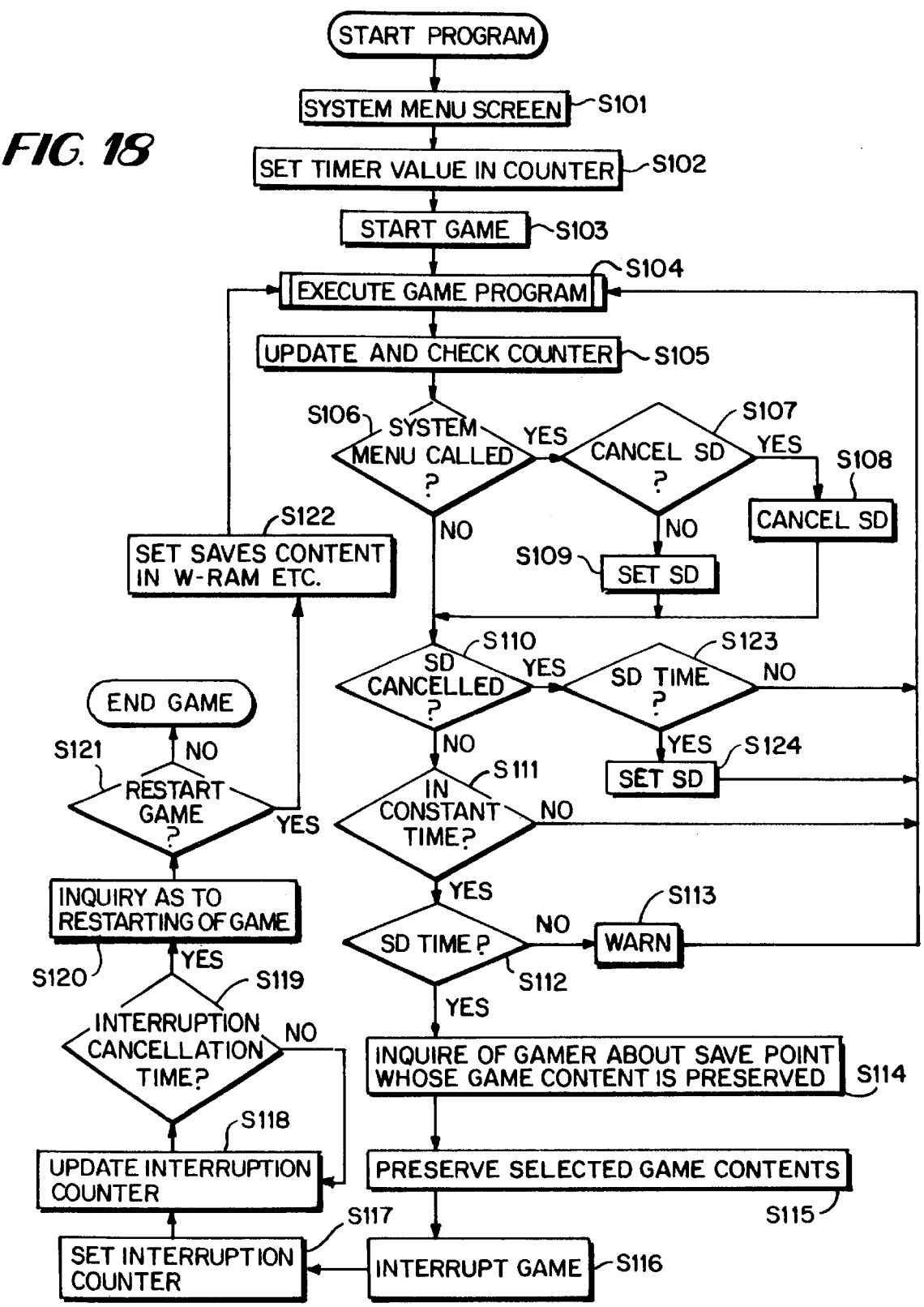
FIG. 18 is a flow chart showing an operation of the fourth embodiment.

FIG. 18 is a flow chart showing the operation of the fourth embodiment. In the flow chart shown in FIG. 18, steps S114 and S115 are added between the steps S112 and S116 in the flow chart shown in FIG. 8. The remaining steps are similar to those shown in FIG. 8. The operation at the step S104 is similar to that shown in FIG. 9. The operation of the fourth embodiment is now described with reference to FIGS. 9 and 18.

At the step S205 in FIG. 9, the game data at the respective save points are successively stored in the temporary storage area of the backup memory 420. When the backup memory 420 is full, the game data of the oldest save point is deleted to write new game data. When a determination is made at the step S112 that a planned game interruption time comes, the CFU 221 inquires of the player about the save point whose game data are stored among the plurality of game data which are stored in the temporary storage area of the backup memory 420, through a picture or the like (step S114). In response to this, the player operates the controller 6 to select the game data to be saved. Then, the CPU 221 reads the game data selected by the player from the temporary storage area, and stores the game data in the preservation storage area of the backup memory 420 (step S115). Thereafter the game operation is interrupted (step S116), so that the operation at the steps S117 to S122 is carried out. At the step S122 the game data stored in the preservation storage area of the backup memory 420 is set in the work memory 222 or the like. Thus, the game is restarted from the game states of the save point selected by the player.

An operation similar to that of the fourth embodiment can be readily implemented also in the second and third embodiments.

While the temporary storage area is provided in the backup memory 420 in the fourth embodiment, the temporary storage area may alternatively be provided in another memory, so far as this memory is reloadable.

While each of the aforementioned embodiments has been described with reference to an electronic game device employing a picture display which is used in a state approached to both eyes of the player, the present invention is also applicable to an electronic game device displaying game pictures on a CRT display or a liquid crystal display, as a matter of course. Further, the present invention is not restricted to the electronic game device, but also applicable to another type of picture display such as a personal computer or an education unit which is operated by a program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A picture display unit comprising:

program storage means storing a picture display program;

processing means executing picture display processing in accordance with said picture display program being stored in said program storage means;

data storage means for storing progress situation data for indicating the progress situation of said picture display processing;

save point detecting means for detecting predetermined proper save points during execution of said picture display processing by said processing means;

decision means for deciding a state for preserving said progress situation data at a time corresponding to the detection of the save points by said save point detecting means;

data preservation control means storing said progress situation data in said data storage means every time said decision means decides said state for preserving said progress situation data;

counter means for counting a continuous execution time of said picture display processing by said processing means;

interruption means interrupting said execution of said picture display processing by said processing means at a time that is independent of said save points when said continuous execution time being counted by said counter means reaches a previously set permissible picture display continuation time; and restarting control means for making said processing means restart execution of said picture display processing from one of said save points ahead of said interruption on the basis of said progress situation data being stored in said data storage means when a prescribed condition for restarting is satisfied after said interruption means interrupts said picture display processing by said processing means.

2. The picture display unit in accordance with claim 1, further comprising change means for changing said previously set permissible picture display continuation time.

3. The picture display unit in accordance with claim 1, further comprising cancellation means for canceling said state where said execution of said picture display processing by said processing means is interrupted before said prescribed condition for restarting is satisfied.

4. The picture display unit in accordance with claim 1, wherein said data storage means has a temporary storage area and a preservation storage area, said data preservation control means stores said progress situation data in said temporary storage area every time said save point detecting means decides said state for preserving said progress situation data while storing said progress situation data being stored in said temporary storage area in said preservation storage area when said interruption means interrupts said execution of said picture display processing by said processing means, and said restarting control means makes said processing means restart execution of said picture display processing from said save point ahead of said interruption on the basis of said progress situation data being stored in said preservation storage area when said prescribed condition for restarting is satisfied after said interruption means interrupts said execution of said picture display processing by said processing means.

5. The picture display unit in accordance with claim 4, wherein said temporary storage area stores progress situation data at a plurality of save points, said picture display unit further comprises selection means for selecting desired one from said plurality of progress situation data being stored in said temporary storage area, and said data preservation control means reads said progress situation data being selected by said selection means and stores the same in said preservation storage area when said interruption means interrupts said execution of said picture display processing by said processing means.

6. The picture display unit in accordance with claim 1, wherein said restarting control means makes said processing means restart execution of said picture display processing from said save point ahead of interruption on the basis of said progress situation data being stored in said storage means when an execution interruption continuation time of said picture display processing reaches a prescribed relation with a previously set restartable time after said interruption means interrupts said execution of said picture display processing by said processing means.

7. The picture display unit in accordance with claim 6, further comprising change means for changing said previously set restartable time.

8. A picture display system comprising a picture display unit body outputting a picture signal by executing picture display processing in accordance with a picture display program, and a cartridge detachably connected with said picture display unit body, said cartridge comprising:

a substrate;

program storage means being provided on said substrate for storing said picture display program and an interruption processing program; and data storage means being provided on said substrate and storing progress situation data for indicating the progress situation of said picture display processing, said picture display unit body comprising:

processing means executing said picture display processing in accordance with said picture display program;

save point detecting means for detecting previously set proper save points during execution of said picture display processing by said processing means;

decision means for deciding a state for preserving said progress situation data at each of said save points detected by the save point detecting means;

data preservation control means for storing said progress situation data in said data storage means every time said decision means makes a decision on said state for preserving said progress situation data;

counter means counting a continuous execution time of said picture display processing by said processing means;

interruption means interrupting said execution of said picture display processing by said processing means at a time independent of said save points when said continuous execution time being counted by said counter means reaches a prescribed relation with a previously set permissible picture display continuation time; and restarting control means for making said processing means restart execution of said picture display processing from a last of said save points ahead of interruption on the basis of said progress situation data being stored in said data storage means when a prescribed condition for restarting is satisfied after said interruption means interrupts said execution of said picture display processing by said processing means, said cartridge being mounted on said picture display unit body thereby electrically connecting said picture display unit body with said substrate, so that said decision means, said data preservation control means, said counter means, said interruption means and said restarting control means operate in accordance with said interruption processing program in response to said processing means execution said picture display program.

9. The picture display system in accordance with claim 8, wherein said picture display unit body further comprises means for changing said previously set permissible picture display continuation time.

10. The picture display system in accordance with claim 8, wherein said picture display unit body further comprises cancellation means for canceling said state where said execution of said picture display processing by said processing means is interrupted before said prescribed condition for restarting is satisfied.

11. A picture display unit comprising:

a program memory storing a picture display program, where the picture display program includes instructions to:

generate pictures for display, generate progress situation data indicative of interactions between a person using the picture display unit and the generated pictures, and predefined save points in the program instructions;

a processor connected to the program memory, wherein the processor executes the instructions of the picture display program to generate the pictures for display and progress situation data based on interactions between the person and the display unit, and detects the predefined save points during the execution of the program;

a data memory storing progress situation data, where the progress situation data is indicative of a state of the picture display program corresponding to a detected save point;

wherein, after an interruption of the program, said processor accesses the progress situation data in the data memory to restart the picture display program at the state of the picture display program corresponding to the last save point, which state is independent of a state at which the picture display program is interrupted.

12. A picture display unit as in claim 11, wherein the picture display unit is a video game display unit and the picture display program is a video game.

13. A picture display unit as in claim 11, wherein the data memory is a temporary memory storing progress situation data that is overwritten as a new save point is detected.

14. A method for restarting picture display programs on a picture display unit having a processor, a program memory and a data memory, the method comprising the steps of:

a. generating interactive pictures to be displayed by the processor, which accesses the program memory to execute the picture display program and monitors interactions between a person and the picture display unit;

b. detecting predefined save points in the program as the processor executes the program;

c. saving progress situation data in the data memory indicative of a state of the picture display program corresponding to the detected save point;

d. having an interruption of the picture display program occur at a point in time unrelated to the detection of the save points in step (b);

e. after step (d), restarting the execution of the picture display program at the state of the picture display program corresponding to a last save point by using the progress situation data stored in the data memory.

15. A method for restarting a picture display program as in claim 14 wherein in step (e) the state of the picture display program used to restart the program is not a state of the picture display program that existed when the program was interrupted in step (d).

16. A method for restarting a picture display program as in claim 14 further including step (f) of overwriting the saved progress situation data in data memory when another save point is detected, and step (f) is preformed prior to step (d).

17. A method for restarting a picture display program as in claim 14, wherein the picture display program is a video game and the picture display unit is a video game unit, and the save point detected in step (b) occurs at a transition between scenes of the pictures generated by the video game.

18. A method for restarting a picture display program as in claim 14, wherein the save point detected in step (b) occurs at a transition between scenes of the pictures generated by the picture display program.

* * * * *